United States Patent [19]

Enbutsu et al.

[11] Patent Number: 5,581,459
[45] Date of Patent: Dec. 3, 1996

[54] PLANT OPERATION SUPPORT SYSTEM

[75] Inventors: Ichiro Enbutsu; Kenji Baba; Shoji Watanabe; Hayao Yahagi; Naoki Hara, all of Hitachi; Mikio Yoda, Ibaraki-ken, all of Japan

[73] Assignee: Hitachi, Ltd., Tokyo, Japan

[21] Appl. No.: 765,839

[22] Filed: Sep. 26, 1991

[30] Foreign Application Priority Data

Sep. 26, 1990 [JP] Japan .................................. 2-256094
Nov. 30, 1990 [JP] Japan .................................. 2-340483

[51] Int. Cl.$^6$ .......................... G05B 13/02; G06F 15/18
[52] U.S. Cl. ........................ 364/152; 364/148; 395/22; 395/903; 395/906
[58] Field of Search .......................... 395/22–24, 76, 395/903, 906, 21; 364/148, 152, 188

[56] References Cited

U.S. PATENT DOCUMENTS

| | | | |
|---|---|---|---|
| 5,121,467 | 6/1992 | Skeirik | 395/906 |
| 5,168,549 | 12/1992 | Takagi et al. | 395/21 |
| 5,175,797 | 12/1992 | Funabashi et al. | 395/22 |
| 5,222,210 | 6/1993 | Leivian | 395/12 |
| 5,333,240 | 7/1994 | Matsumoto et al. | 395/23 |

FOREIGN PATENT DOCUMENTS 8600156  1/1986  WIPO .................................. 364/148

OTHER PUBLICATIONS

Inter. Neural Network Conf. INNC 90 Paris Jul. 9–13, 1990 pp. 314–317, Okagaki.
AI Expert, Apr. 1991, pp. 47–51, Interpreting Neural –Network Connection weights, Garson.
IJCNN–91, 8–14 Jul. 1991, "Fuzzy Rule Extraction from a Mutilayered Neural Network", Enbutsu et al. pp. 461–465.
IJCNN, Jun. 17–21, 1990, Explicit Representation of Knowledge Acquired from Plant Historical Data using Neural Network, Baba et al., pp. 155–160.

Primary Examiner—Roy N. Envall, Jr.
Assistant Examiner—Steven R. Garland
Attorney, Agent, or Firm—Antonelli, Terry, Stout & Kraus

[57] ABSTRACT

When amounts of operation control variables and/or operation state evaluation variables of a plant are calculated through a multilayered neural network based on data indicating a plant state, and the calculated results are indicated to an operator, a plant operation support system has functions to analyze an internal causality between neurons in the neural network, and display quantitative guidance by association in the neural network and also the analyzed result of the internal causality between the neurons as an association reason.

6 Claims, 11 Drawing Sheets

FIG. 7

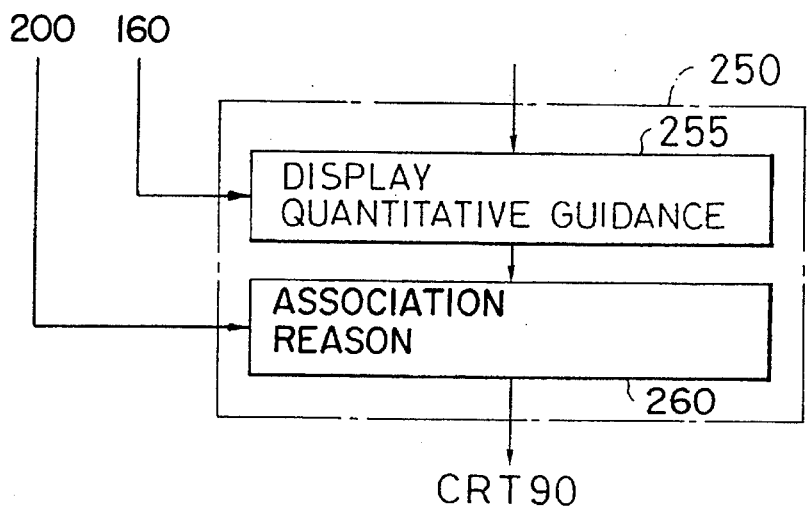

FIG. 8

```
COAGULANT INJECTION GUIDANCE

● ESTIMATE: JUDGING FROM OPERATION HISTORY,
           OPTIMUM INJECTION RATE AT THIS
           MOMENT IS CONSIDERED TO BE [15] ppm.
● OPERATION: IT IS ADVISABLE TO
           [SLIGHTLY INCREASE (BY APPROX. 2ppm)]
           THE INJECTION RATE.
● BASIS:   INJECTION RATE HAS BEEN ESTIMATED ON
           THE BASIS OF THE FOLLOWING CAUSALITY.
```

| [CAUSALITY] | [PRESENT STATE] |
|---|---|
| RISE OF RAW WATER CONTAMINATION | INCREASE FROM 20 TO 25ppm IN 1 HOUR |
| LOW WATER TEMPERATURE | 5°C |
| SMALL FLOCK PARTICLE SIZE | 0.6mm |
| REQUIRES INCREASE OF INJECTION RATE | | ns as references for selection, based on the experiences of the operator and thus entails intricate acquisition of knowledge.
PLANT OPERATION SUPPORT SYSTEM

BACKGROUND OF THE INVENTION

1. Field of the Invention

The present invention relates to a plant operation support system employing a neural network, and more particularly to a plant operation support system which has high support capability such as displaying quantitative guidance as well as presenting the rational for the guidance.

The present invention also relates to a plant operation support system with a high support capability which displays only necessary data to an operator by periodically evaluating and selecting those items, having a large degree of influence upon operational control variables and operational state evaluation variables of a plant, from among a number of plant data items.

2. Description of the Prior Art

In operation management for water purification plants, sewage treatment plants, chemical reaction plants and so on, it is important to measure the number of data items of the plant through online processing, evaluate the plant state changing from time to time, and determine appropriate amounts of control variables.

As disclosed in Japanese Patent Laid-Open No. 63-240601 and No. 61-59502, for example, the approach of knowledge engineering for extracting heuristics of an operator and employing an inference engine along with the extracted knowledge is applied to the operation management.

A support system based on the knowledge engineering is persuasive to the operator because the inference process is logically clear and the reasons for the guidance derived from inference can be presented. On the contrary, it is troublesome in points of acquiring the experiential knowledge and carrying out maintenance service.

One solution of such a problem is disclosed as a support system based on a neural network model in Japanese Patent Laid-Open No. 1-224804.

With that model, the knowledge corresponding to experience and perception of the operator, which are included in operational historical data, is learned and only quantitative guidance is presented by association made in the model after the learning. If there is operational historical data, operation support can be realized by the association without the intricate process of acquiring the knowledge.

A conventional support system based on the neural network model has the following problems.

Since the learning and association using the neural network model are executed as a black box via only numerical data such as that given by the operational historical data and a group of parameters in the model, the knowledge learned in the model and the reasons of association are not seen by the operator. Therefore, the quantitative guidance by association is not sufficiently persuasive.

In an error backpropagation method for a multilayered neural network model, it sometimes happens that a parameter group (matrix of weighting factors) representing intensities of internal connections of the model is converged to a value which conflicts with knowledge (causality between input and output) contained in the operational historical data or knowledge which is not important for association. This may result in that the knowledge for the reasons of association is not correct and the association is not performed with a sufficient degree of accuracy.

Further, a large amount of online data derived from water purification plants, sewage treatment plants, chemical reaction plants and so on makes it difficult for the operator to supervise all those data at a time and judge the plant state. It is therefore important that only the control variables and those factors which greatly affect the state are selectively indicated to the operator from time to time.

One solution of addressing such a problem is proposed in Japanese Patent Laid-Open No. 64-88713, for example, as a method which comprises the knowledge engineering. This method describes the relationships between control variables or state evaluation variables and each datum in the form of rules based on heuristics for the operator, and determines those relationships through statistic calculations, thereby selectively displaying only the strong relationships.

That selective display serves as operation support for the operator to evaluate the plant state and determine appropriate amounts of the control variables.

Regarding the to selection of data, Japanese Patent Laid-Open No. 61-223944 discloses a technique for taking out from the data base in a memory only those data which satisfy the conditions specified. This technique includes plural condition registers for separately storing therein setting conditions, plural comparators for separately taking in the setting conditions from the condition registers, commonly taking in data from a memory which stores therein data inclusive of object data to be selected, and determining those ones of the taken-in data which satisfy the above setting conditions, and means for taking in outputs of the comparators, calculating the logical OR or AND of those outputs and taking out corresponding data from the memory dependent on the calculated result.

With the above technique, only those data satisfying the desired conditions can be selectively extracted.

The foregoing prior art however includes the following problem.

The method of selecting data with the aid of the knowledge engineering requires forming rules, as references for selection, based on the experiences of the operator and thus entails intricate acquisition of knowledge.

Further, when not only selecting the data but also determining amounts of the control variables and/or state evaluation variables of the plant with the knowledge engineering technique, other inferences than those for the data selection must also be executed, which renders the process intricate. In addition, logic for the data selection and logic for determining amounts of the control variables and/or state evaluation variables cannot be handled uniformly.

With logical operation technique, data of a data string within the same item which satisfy the conditions specified only are selected, and functions for evaluating whether or not selection of those data is necessary for the operator are not provided. Neither are there provided functions to determine the amount of control variables and/or state evaluation variables of the plant in a combined manner.

SUMMARY OF THE INVENTION

An object of the present invention is to provide a plant operation support system which can present not only quantitative guidance by the association of neural network, but also provide the basis of the association, which is thus persuasive.

Another object of the present invention is to provide a plant operation support system which can effectively select and display necessary data based on plant history data by a data selection means without executing any intricate acquisition of knowledge.

Still another object of the present invention is to provide a plant operation support system in which determinations of control variables and/or state evaluation variables of the plant and selection of the data can be executed by one unified logic, and which is thus easily understandable and persuasive to an operator.

To achieve the above objects, the present invention provides a plant operation support system in which amounts of operation control variables and/or operation state evaluation variables of a plant are calculated through a multilayered neural network based on data indicating a plant state, and the calculated results are indicated to an operator to support plant operation. The support system comprises means for analyzing the intensities of internal connections between neurons in the neural network, and means for displaying quantitative guidance by association in the neural network and also the analyzed result of the intensities of internal connections between the neurons as reason of association.

To achieve the above objects, the present invention also provides a plant operation support system comprising means for suppressing unnecessary causalities in the neural network and selectively leaving necessary ones thereof.

The means for analyzing an internal connection between neurons in the neural network and the means for displaying quantitative guidance by association in the neural network and also the analyzed result of the internal connection between the neurons as reason of association may be provided in combination with the means for suppressing unnecessary causalities in the neural network and selectively leaving necessary ones thereof.

Further, the present invention provides a plant operation support system comprising, as means for quantitatively evaluating causality in the neural network, means for calculating the summation of products of values of the intensities in all the paths from an input layer neuron to an output layer neuron, and means for making smaller a square of the summation of products of values or the summation of square of the summation of the products of values when neurons are different, so that an association error of the neural network is reduced.

The means for analyzing the internal connection comprises means for evaluating, based on a value resulting by adding a product of the intensities of connections in a path from a neuron in an input layer of a multilayered neural network model to a neuron in an output layer via a neuron in a hidden layer and a gradient of a conversion function (a differential value of a sigmoid function) for all the paths via different hidden layer neurons, causality between the input layer neuron and the output layer neuron. Here, the differential value of the sigmoid function may be omitted by regarding it to be a fixed value.

The means for displaying quantitative guidance and an association reason comprises means for displaying the learned causality between an input layer neuron and an output layer neuron in the neural network as rules.

Moreover, the present invention provides a plant operation support system comprising data selection means for determining the degree of causality between input and output of the neural network and selecting data which has causality larger than a preset threshold, and data display means for displaying the selected data.

The data selection means is means for selecting such a data item that an absolute value of the value resulted by adding a product between the intensities of connections in a path reaching an output layer neuron and a differential value of a conversion function used at a passing neuron for all the paths via different intermediate layer neurons exceeds a preset threshold, as data having the significant causality.

The data display means preferably includes means for rearranging the selected data in the order of importance.

The above plant operation support system can further comprise data prediction means for predicting the amounts of the operation control variables and/or operation state evaluation variables of said plant, and guidance means for preparing prediction information about the operation state of the plant based on the predicted result, and sending the prediction information to the data display means.

The guidance means is means for outputting at least one of operation schedule and the prediction of abnormal conditions of the plant.

The data prediction means is means for obtaining the information by using the same neural network used with the data selection means.

The data display means is means for qualitatively evaluating the data item selected by the data selection means, more specifically means for statistically analyzing each data with respect to a population and qualitatively evaluating the data item.

The data display means may be means for determining a degree of adaptation for each data item by using the use of a preset membership function and qualitatively evaluating the data item.

The means for analyzing an internal connection between neurons in the neural network and the means for displaying quantitative guidance by association in the neural network and the analyzed result of the internal connection between the neurons as reason for association may be provided in combination with the data selection means for determining the degree of causality between input and output of the neural network and selecting that data which has causality larger than a preset threshold, and the means for displaying the selected data.

Further, the means for suppressing unnecessary causalities in the neural network and selectively leaving necessary ones thereof may be provided together with the data selection means for determining the degree of causality between input and output of the neural network and selecting that data which has causality larger than a preset reference, and the means for displaying the selected data.

In the present invention, not only the quantitative guidance but also the judgmental reasons for the guidance are presented, thereby providing persuasive support to an operator.

Since the present invention adopts a learning method to leave the necessary minimum amount of causalities, association itself becomes precise and so does knowledge obtained by analyzing the internal state. Accordingly, operation support can be achieved with high reliability.

Since those plant data item which are important for judgment by the operator are selected and displayed, display of those data serves as effective operation support.

The present invention employs capabilities of both learning and association of the neural network, making it possible to determine the amounts of the control variables and/or state evaluation variables of the plant, as well as selection of the data.

BRIEF DESCRIPTION OF THE DRAWINGS

FIG. 7 is a flowchart showing an operation sequence of guidance display means used in this embodiment.

FIG. 8 is a diagram showing one example of images demonstrated on display means used in this embodiment.

DESCRIPTION OF THE PREFERRED EMBODIMENTS

The present invention is introduced to an intellectually supporting system for operation management of a plant which requires judgment by an operator. Therefore, the present invention can be applied to various types of plants controlled by the operator, such as water purification plants, sewage treatment plants, chemical reaction plants, biological engineering plants, nuclear power plants, and also for financial transactions of stocks and exchanges, for example.

Hereinafter, one embodiment of a plant operation support system according to the present invention will be described with reference to FIGS. 1 to 9.

Figure 1:
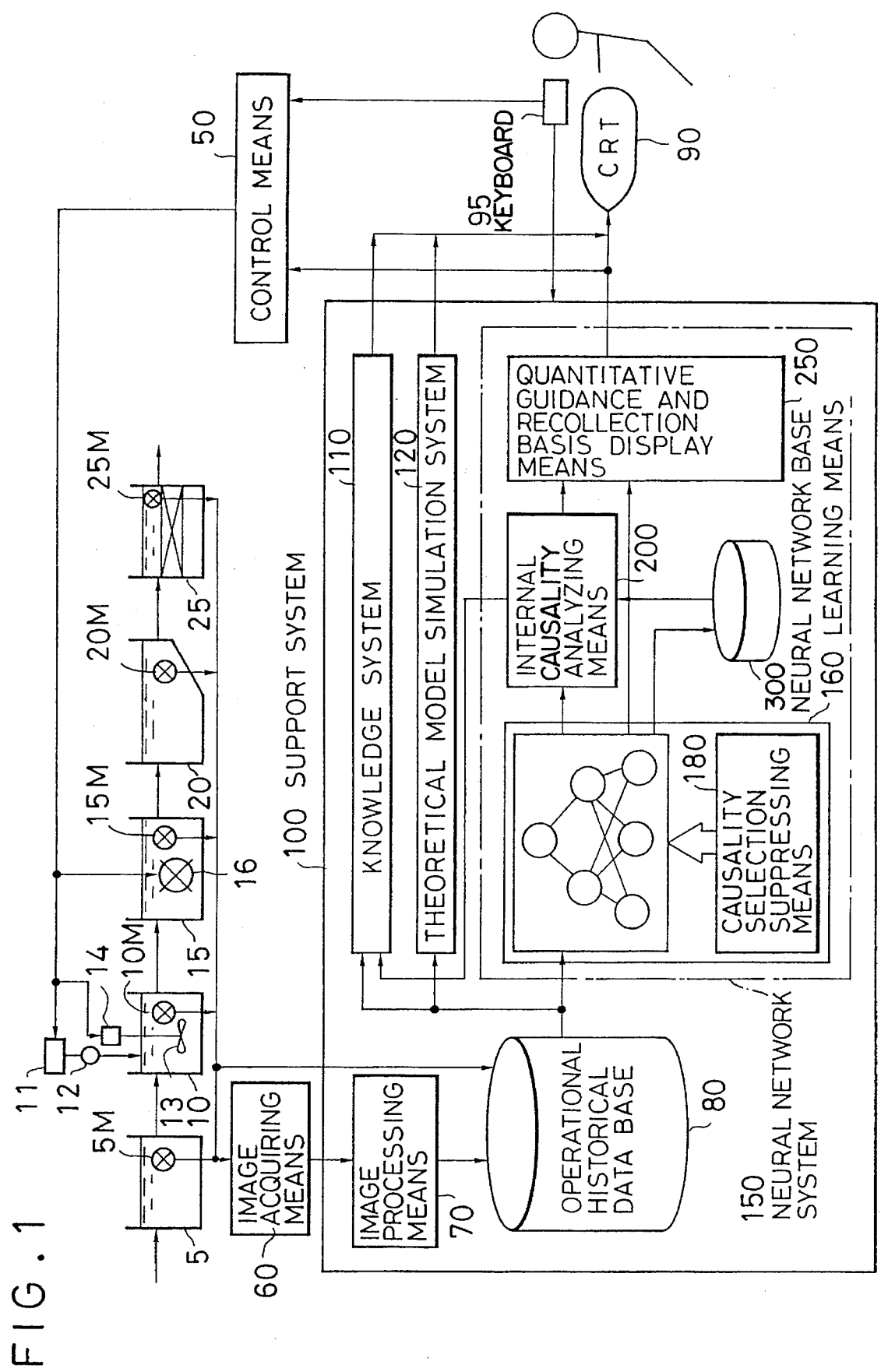
FIG. 1 is a block diagram showing the outline of an embodiment in which a plant operation support system of the present invention is applied to operation management of a water purification plant.

FIG. 1 is a block diagram showing the outline of an embodiment in which the plant operation support system of the present invention is applied to operation management of a water purification plant.

First, procedures of the water purification plant will be explained briefly. In FIG. 1, raw water is led from rivers, lakes or marshes to an influent reservoir 5. In a mixing tank 10 to which the water is introduced from the influent reservoir 5, a coagulant is injected from a coagulant tank 11 by a coagulant injection pump 12 and an agitating propeller 13 is driven by an agitator 14 to stir the water in the tank 10. Here, an alkali agent for accelerating formation of flocks may also be injected. An agitating paddle 16 is disposed in a flock forming tank 15 and rotated moderately. The flocks are precipitated in a settling pond 20 and a supernatant fluid is filtered in a filtration pond 25.

A measuring system will be next explained. A measuring instrument (sensor) 5M is placed in the influent reservoir 5 to measure qualities of the raw water. Measured items include a water temperature, turbidity, alkalinity, electric conductivity, pH, concentration of residual chlorine, chlorine demand, water influent rate, water level, etc.

A measuring instrument 15M is placed in the flock forming tank 15. The measuring instrument 15M measures the same items as those measured by the measuring instrument 15M and additionally includes an image acquiring means 60 such as an underwater camera. A measuring instrument 20M is placed in the settling tank 20. Further, a measuring instrument 10M similar to the measuring instrument 15M is placed in the mixing tank 10. In some cases, a measuring instrument 25M may be placed in the filtration pond 25. Measured items of the measuring instruments 20M, 10M and 25M are the same as those measured by the measuring instruments 5M, 15M.

The measured data are taken in to an operational historical data base 80 in a support system 100. The data obtained by the image acquiring means 60 are processed by an image processing means 70 and, thereafter, taken into the operational historical data base 80.

There will now be explained an intellectual operation management support system (support system) 100 for supporting operation management of the plant.

The support system 100 comprises a knowledge based operation support system (knowledge based system) 110, a theoretical model simulation system 120, neural network applied operation support system (neuro system) 150, the image processing means 70, and the operational historical data base 80.

The neural network system 150 featuring this embodiment comprises a learning means 160, an internal causality analyzing means 200, a quantitative guidance and association reason display means (guidance display means) 250, and a neural network base 300. Among them, the learning means 160 is featured in having a causality selection suppressing means 180.

The neural network system 150 first selects, as training (teacher) data, those historical data items which are considered to be useful from the operational historical data base 80. These training data are learned in the learning means 160 through a neural network. During the learning process, the causality selecting suppressing means 180 is used to suppress unnecessary causalities and selectively leave necessary causalities. This will be explained later in detail.

The neural network after the learning has two roles. The first role is to determine quantitative guidance required for the operation management by association and send the result to a display means 250. The second role is to send a matrix of weighting factors after the learning to the internal causality analyzing means 200 and extract the knowledge included in the matrix of weighting factors. The extracted knowledge is sent to the display means 250 and also the knowledge based system 110 to be used as rules for inference. A manner of extracting the knowledge will be explained later in detail.

The display means 250 displays both the quantitative guidance and the extracted knowledge on the screen of a CRT 90. This enables the operator to know how the guidance is derived from the neural network.

Inputting and outputting of various data to and from the support system 100 will be described below.

There will be first explained inputting of the data. The measuring instruments 5M, 10M, 20M, 25M and the image acquiring means 60 execute sampling of data at predetermined time intervals. The sampled data are sent to the operation history data base 80 and stored therein. Also, manually analyzed data and visually observed data, which cannot be online measured by the measuring instruments, are input from a keyboard 95 in an interactive manner while referring to messages on the screen of the CRT 90.

There will be next explained outputting of the data. The support system 100 determines the contents to be guided dependent on the input data. The guidance obtained from the knowledge based system 110 and the neural network system 150 in the support system 100 is displayed to the operator via the screen of the CRT 90. Note that the CRT 90 can double as a monitor for presenting an image from the image acquiring means 60 on demand.

While referring to the guidance, the operator enters changes in amounts of control variable, which are considered to be necessary, to a control means 50 via the keyboard 95. The control means 50 controls various equipment of the plant dependent on the input data. In some cases, the guidance from the support system 100 may be directly input to the control means 50.

Figure 2:
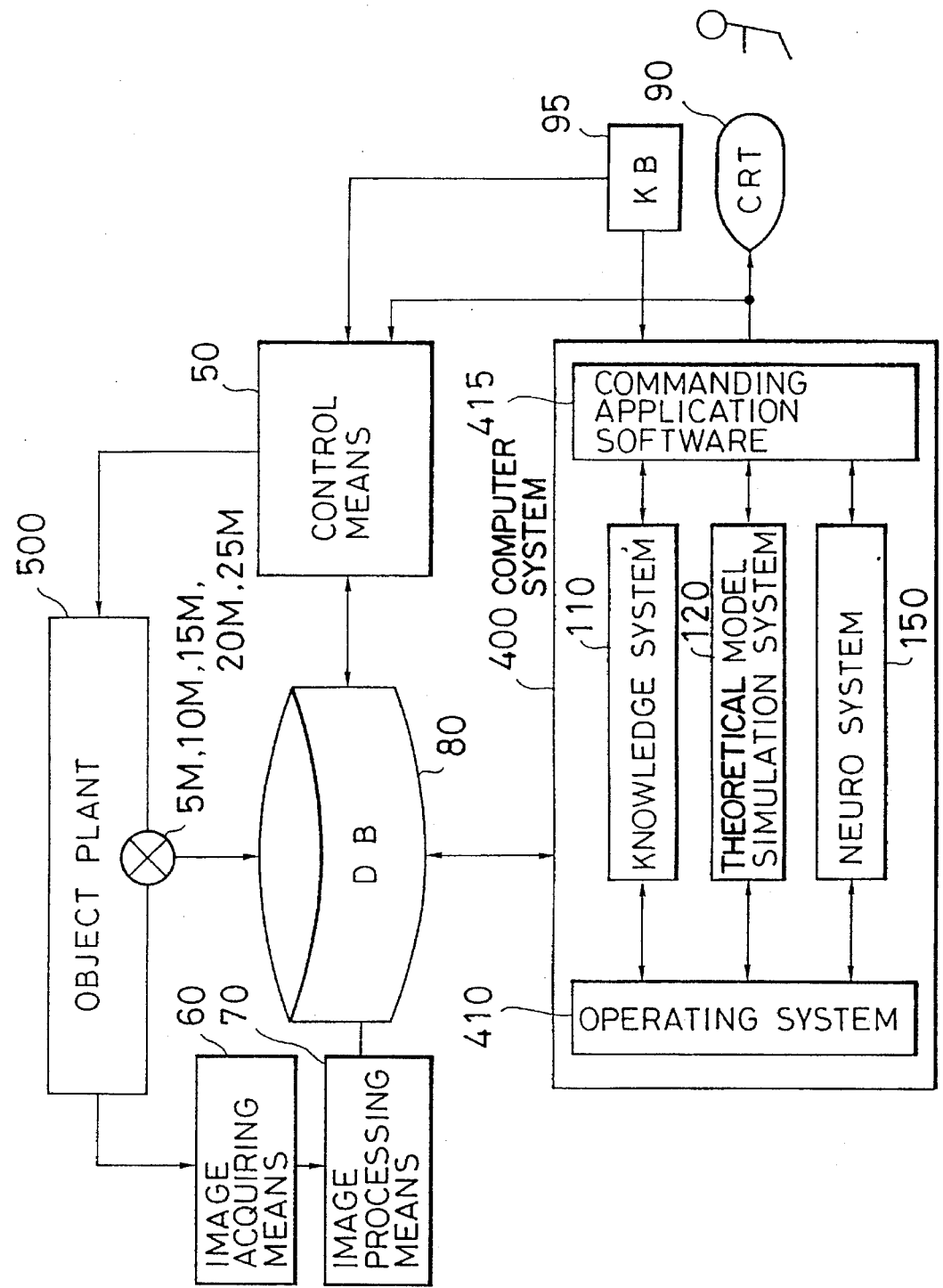
FIG. 2 is a block diagram showing one example of hardware configuration of the plant operation support system shown in FIG. 1.

FIG. 2 is a block diagram showing one example of hardware configuration of the plant operation support system shown in FIG. 1.

The support system 100 includes an operational historical data base 80 for taking in and storing information indicative of the state of an object plant 500 directly from sensors 5M to 25 M and indirectly from an image acquiring means 60 via an image processing means 70, and a computer system 400 connected to the operational historical data base 80 for processing the data. Connected to the computer system 400 are control means 50 for controlling the object plant 500, a CRT display 90 as a display unit, and a keyboard 95. In addition, a mouse or other pointing device may be connected, as other input means, to the computer system 400.

Though not shown, the computer system 400 comprises at least a central processing unit CPU, a main memory and an external memory. An operating system (OS) 410 and a commanding application software 415 are installed in those hardwares. There are also incorporated therein a knowledge system 110, a theoretical model simulation system 120, and a neural network system 150 as a main subject of the present invention, which are executed under such hardware environment.

A magnetic disk unit, for example, can be used as the external memory. The operational historical data base 80 can also be constituted by a magnetic disk unit. Note that rather than using two separate magnetic disk units, different areas of a single magnetic disk unit may be used for specific purposes.

The control means 50 is also constituted by a computer system and is connected to the keyboard 95. Rather than using the single is keyboard 95, the control means 50 and the computer system 400 may be associated with separate keyboards.

Next, the learning of a neural network model and extraction of the knowledge both made in the neural network system 150 will be described in order.

The neural network model is derived from nerve cells (neurons) constituting a brain. Mathematical models of a single neuron reflecting physiological findings of the neurons have been widely utilized.

Figure 3:
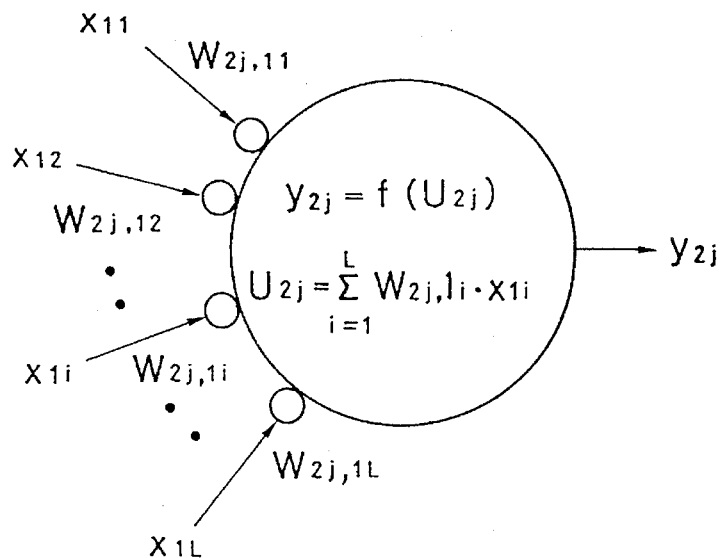
FIG. 3 is a diagram showing basic operation of a nerve cell (neuron) as a basic component of a neural network.

FIG. 3 shows a basic formula of a neuron. An illustrated model is expressed by functions, such as Equations (1) to (3) below, having threshold characteristics of a multiple inputs—single output element:

$$y_{2j} = f(u_{2j}) \quad (1)$$

$$u_{2j} = \sum_i w_{2j,1i} \cdot x_{1j} \quad (2)$$

$$f(u) = 1/\{1 + \exp(-u + \theta)\} \quad (3)$$

where $y_{2j}$: output signal of neuron $2j$ $u_{2j}$: summation of weighted inputs to neuron $2j$ $w_{2j,1i}$: weighting factor between neurons $1j$ and $2j$ $x_{1i}$: input signal from neuron $1j$ f: sigmoid function $\theta$: threshold (bias value)

Specifically, a signal to one neuron from another neuron is multiplied by the bond intensity of the connections (weighting factor) between the two neurons. When the total $u_{2j}$ of these weighted input signals $w_{2j,1i} \cdot x_{1j}$ exceeds a certain threshold $\theta$, the neuron is excited so as to produce an output signal $Y_{2j}$. Threshold characteristics at this time are determined by a sigmoid function of Equation (3).

Figure 4:
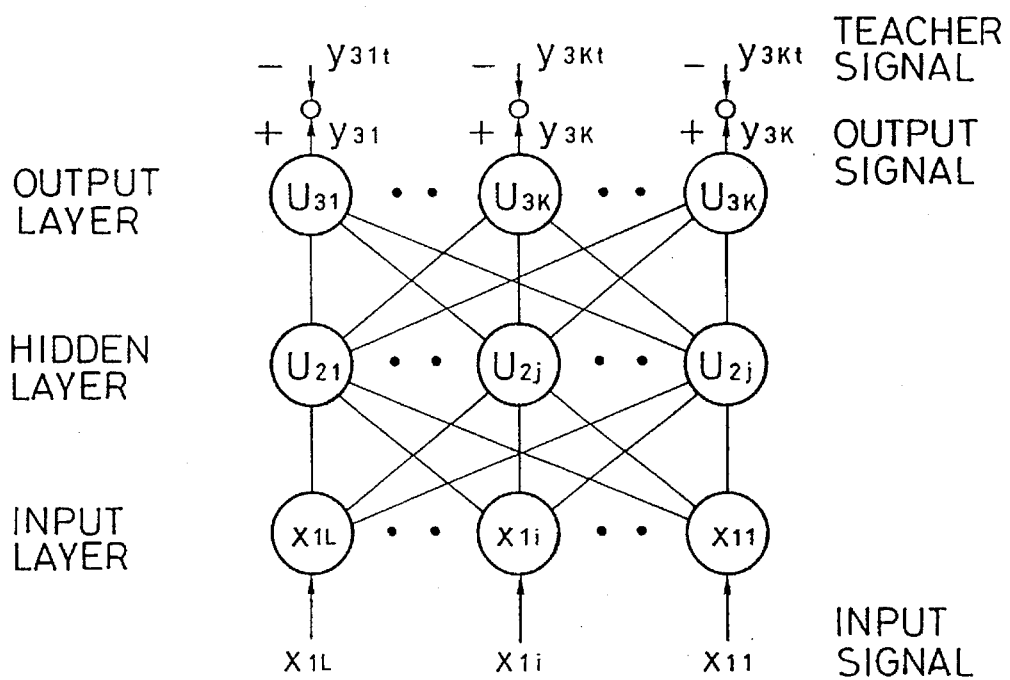
FIG. 4 is a diagram showing one example of configuration of a multilayered neural network model used in this embodiment.

The neural network model is a network type model using the above-stated neuron as a basic element. Although a plurality of models have been proposed so far, the present invention uses a multilayered model (also called Rumelhart type model) in which neurons are assigned in a multilayered structure. This model has a three-layer structure comprising an input layer, a hidden layer and an output layer, as shown in FIG. 4.

Learning of the neural network model is executed by correcting a matrix of weighting factors in such a manner as to reduce association errors. In a conventional BF method (Error Backpropagating Method) which has been most widely used as a learning algorithm (see Rumelhart, D.E., etc. (1986), Learning Representations by Backpropagating Errors, Nature, vol. 323, by way of example, for details of the algorithm), the summation of the square of the association errors is defined as an evaluation function and the matrix of weighting factors is corrected so as to reduce the evaluation function. Because the neural network system 150 has an aim of presenting the guidance by association and the association reasons, features required for the learning are to determine the matrix of weighting factors so that (1) the association errors can be reduced and (2) the causalities between the input and output data can be extracted correctly. However, the evaluation function of the conventional BP method has suffered from the following problems.

Since only errors are reflected on the correction of the matrix of weighting factors, the unnecessary causality which does not actually affect the output may remain in the model. The possibility of such an event is increased, particularly, when dependent data items are included.

Furthermore, the conventional BP method is a gradient descending method (i.e., a method by which correction is made only in a direction of reducing the evaluation value from its initial value) applied to the summation of the square of the association errors, and the converged destination is changed dependent on the initial values of the matrix of weighing factors. In some cases, therefore, the evaluation value may converge to different local minimum values dependent on initial values and a sufficient degree of association accuracy cannot be thus obtained.

To overcome the foregoing problems in the conventional BP method, the present embodiment introduces a learning method added with an evaluation term for suppressing the total amount of causalities in the neural network based on the assumptions listed below:

A. Relating to causalities between the input and output data, more precise expression can be achieved with the minimum amount of necessary causalities; and B. The neural network involving the precise causalities has small association errors.

To avoid the foregoing problems in the conventional BP method, the learning method based on the above assumptions can execute:

a. learning to suppress unnecessary causalities and selectively leave necessary causalities; and b. learning to avoid the gradient descending method for errors and make dependency on an initial value small.

This BP method added with the new evaluation term is called "causality selecting BP method" in this specification. The learning algorithm is as follows. (Weighting factors $w_{3k,2j}$ between the output layer and the hidden layer)

$$\Delta w_{3k,2j} \propto -(\partial E_{EC,3k}/\partial w_{3k,2j}) \quad (4)$$
$$E_{EC,3k} \equiv E_{E,3k} + E_{C,3k} \quad (5)$$
$$E_{E,3k} = 0.5 \sum_{k}(y_{3kt} - y_{3k})^2 \quad (6)$$
$$E_{C,3k} = 0.5 \, \epsilon \sum_{k}\sum_{i} C^2_{3k,1i} \quad (7)$$

(Weighting factors $w_{2j,1i}$ between the hidden layer and the input layer, $$\Delta w_{2j,1i} \propto -(\partial E_{EC,3k}/\partial w_{2j,1i}) \quad (8)$$
$$E_{EC,3k} \equiv E_{E,3k} + E_{C,3k} \quad (9)$$

where $C_{3k,1i}$: causal index between output layer neuron $3k$ and input layer neuron $1i$ $E_{C,3k}$: causality suppressing evaluation function $E_{E,3k}$: error evaluation function $E_{EC,3k}$: evaluation function of causality selecting BP method $w_{3k,2i}$: weighting factor between output layer neuron $3k$ and hidden layer neuron $2j$ $\Delta w_{3k,1i}$: correction amount of weighting factor $w_{3k,2i}$ $w_{2j,1i}$: weighting factor between hidden layer neuron $2j$ and input layer neuron $1i$ $\Delta w_{2j,1i}$: correction amount of weighting factor $w_{2j,1i}$ $x_{1i}$: input to input layer neuron $1i$ $y_{2j}$: output of hidden layer neuron $2j$ $y_{3k}$: output of output layer neuron $3k$ $y_{3kt}$: teacher signal for output layer neuron $3k$ $\epsilon$: causality suppressing coefficient Equations (4) and (8) imply that the weighting factors are corrected by the gradient descending method for the evaluation function. Equation (6) is a well-known error evaluation term also used in the conventional BP method.

On the other hand, Equation (7) is an equation newly introduced in the present invention and gives an evaluation term indicating the total amount of causalities involved in the neural network. $C_{3k,1i}$ is a value indicating the intensity of causality between the input layer neuron $1i$ and the output layer neuron $3k$, and is referred as "causal index". In other words, the summation of the square of degrees of causalities is defined as the total summation of causalities. Details of a degree of causality will be described later in more detail with regards to a data selection method.

With the above newly introduced evaluation term, the learning is executed so as to reduce the number of causalities in the neural network. By adjusting the causality suppressing factor $\epsilon$, a degree of causality suppression can be changed. For the learning of coagulant injection data of the water purification plant, maximum association accuracy is obtained at $\epsilon=1\times10^{-5}$ to $2\times10^{-5}$.

Figure 5:
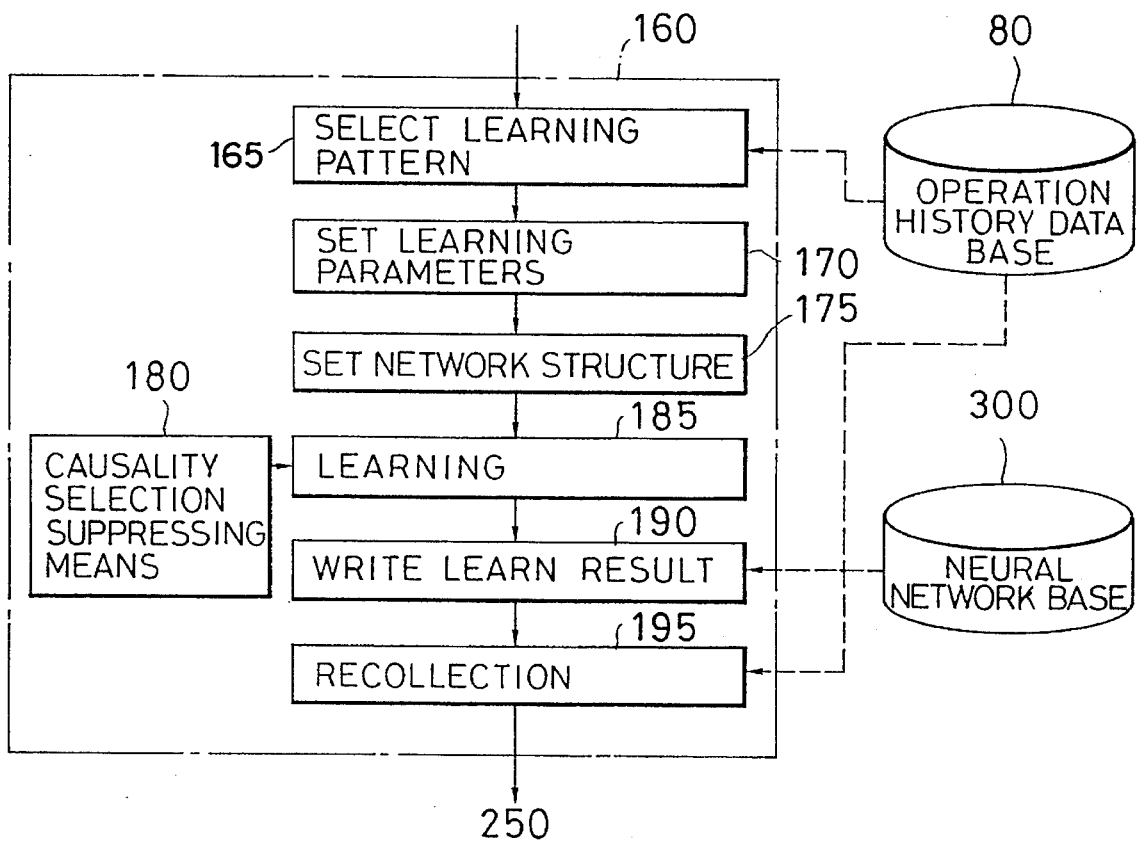
FIG. 5 is a flowchart showing an operation of learning means used in this embodiment.

Configuration of the learning means 160 used in the present causality selecting BP method will be next explained in more detail. FIG. 5 is a flowchart showing steps of the learning means 16.

First, in a learning pattern selection step 165, a learning pattern for use in the learning is selected from the operational historical data base 80. This step selects, among the data with which the plant has been operated with good results, data which make association errors smaller than the previous data through learning thereof. Alternatively, in this step, the operator may select a desired learning pattern in interactive fashion.

Subsequently, necessary conditions are set in a learning parameter setting step 170 and a network structure setting step 175. Examples of learning parameters are an acceleration factor $\eta$ for adjusting the manner of reflecting errors, a smoothing factor $\alpha$ for adjusting how degree past correction amounts of the weighting factors are to be reflected, etc. As to the network structure, the number of neurons in each layer of the neural network model is set.

In a learning step 185, learning is executed with the causality selecting BP method based on the learning conditions set in the preceding steps. A causality selection/suppressing means 180 functions to adjust the causality suppressing coefficient $\epsilon$ stated above. When the means 180 is not actuated to work, i.e., in the ease of $\epsilon=0$, the learning is completely free from causality suppression. Thus, this case corresponds to the conventional BP method.

In a learn result writing step 190, the matrix of weighting factors after the learning is written and stored as a numerical file into the neural network base 300.

The learning means 160 concludes with an association step 195, and a value associated in this step 195 is sent as qualitative guidance to the display means 250.

Figure 6:
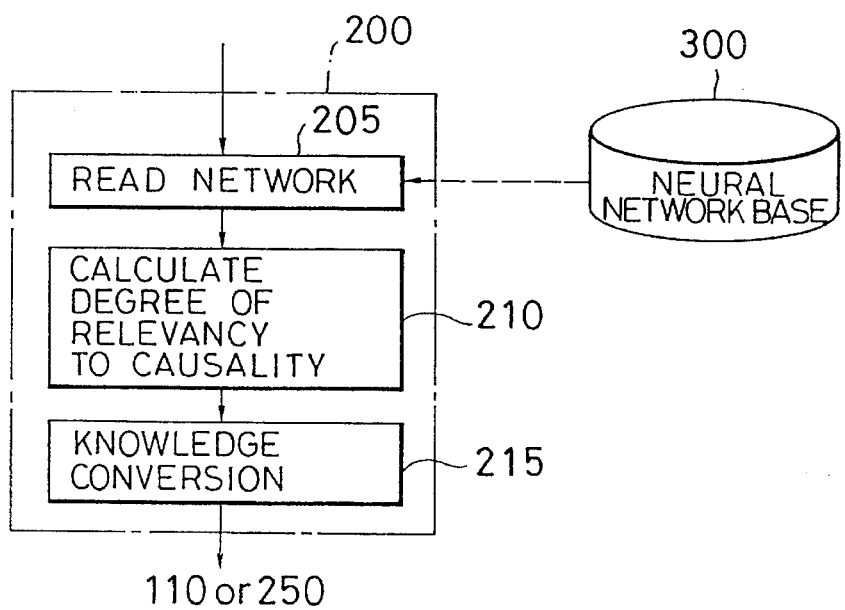
FIG. 6 is a flowchart showing a procedure of internal connection analyzing means of the neural network used in this embodiment.

The internal causality analyzing means 200 will be explained next. In this means, the matrix of weighting factors of the network after the learning is analyzed and the knowledge (causality) involved in the network is extracted as reasons of association. FIG. 6 is a flowchart showing steps of the internal causality analyzing means 200.

First, in a network reading step 205, the matrix of weighting factors after the learning is read from the neural network base 300.

In a causal index calculating step 210, "causal index" for evaluating the causality between input and output of the network is calculated from the matrix of weighting factors thus read.

"Causal index" will now be explained. The reason that the learned network can associate a correct output for the input pattern is because the network involves the knowledge equivalent to the causality between input and output. A degree of influence of an input to the input layer on an output of the network output layer is given by total influences in all the paths on the network from $x_{1i}$ to $Y_{3k}$. Among them, the influence in a path j (j:1 to the number of neurons in the hidden layer) from $x_{1i}$ to $y_{3k}$ via a neuron $2j$ in the intermediate layer is evaluated by a degree of change of $y_{3k}$ upon $x_{1i}$ being changed, i.e., partial differentiation expressed by Equation (12) below.

(Degree of influence of $x_{1i}$ on $Y_{3k}$; path j) $\propto$ $$(\partial y_{3k}/\partial x_{1i})_j \qquad (12)$$

The partial differentiation of Equation (12) can be expressed using $w_{3k,2j}$, $w_{2j,1i}$ as Equation (13) below:

$$(\partial y_{3k}/\partial x_{1i}) = f'(u_{3k}) \cdot f'(u_{2j}) \cdot w_{3k,2j} w_{2j,1i} \qquad (13)$$

While $w_{3k,2j}$ and $w_{2j,1i}$ in Equation (13) are definite values in the network after the learning, differential values $f'(u_{3k})$ and $f'(u_{2j})$ of the sigmoid functions are decided by internal states $u_{3k}$ and $u_{2j}$ of the neurons in the output and hidden layers because the sigmoid functions have non-linearity. Both $u_{3k}$ and $u_{2j}$ are dependent on a pattern of $x_{1i}$ (i:1 to the number of neurons in the input layer) and, therefore, evaluation including $f'(u_{3k})$ and $f'(u_{2j})$ can be made if a definite pattern of $x_{1i}$ is given.

Equation (14) below represents the result of summing the above Equation (13) for all the paths passing the neurons in the hidden layer, and that result is defined as "causal index $C_{3k,1i}$" for evaluating the causality between $x_{1i}$ and $Y_{3k}$:

$$C_{3k,1i} \equiv \sum_j f'(u_{3k}) \cdot f'(u_{2j}) \cdot w_{3k,2j} w_{2j,1i} \qquad (14)$$

By inputting the plant data $x_{1i}$ at each time point to determine $u_{3k}$ and $u_{2j}$ and calculating causal index, it can be recognized that which one of the data varying from time to time has significant causality with respect to the output.

In a knowledge conversion step 215, the knowledge is determined from the calculated causal index. Specifically, it is possible to know the intensity of the causality between $x_{1i}$ and $y_{3k}$ from the magnitude of an absolute value of $C_{3k,1i}$, and also the positive or negative correlation from plus or minus of the sign. By utilizing this, convetsion to the knowledge as shown in (15) below is made on $x_{1i}$ and $y_{3k}$ from $C_{3k,1i}$:

If the data $x_i$ is high, the data $y_k$ is increased (or reduced) $\qquad (15)$ The knowledge of if—then type thus obtained is sent, as a basis of association to be made in the network, to the display means. The knowledge extracted here is also sent to the knowledge based system 110. Those extracted terms of knowledge which are considered to be correct by the operator are stored into a knowledge base within the knowledge based system 110 and used for inference.

Thus, use of the internal causality analyzing means 200 as one feature of the present invention enables acquisition of knowledge that has been a bottleneck in the knowledge engineering.

In the display means 250 as another feature of the present invention, as shown in FIG. 7, the quantitative guidance from the learning means 160 is displayed in a quantitative guidance displaying step 255 and the knowledge from the internal causality analyzing means 200 is displayed in an association reason displaying step 260.

In conventional operation support using a neural network, since no means for presenting the basis of association is provided and the quantitative guidance is only presented through a black box or a like manner, the operator has sometimes hesitated as to judgment on that the presented guidance can be utilized as being correct.

On the contrary, the present invention can indicate the judgment basis of association in the form of rules expressed by natural language as shown in FIG. 8, thereby presenting the guidance which is easily understandable and persuasive to the operator.

A learning method of the present invention will be next described by taking as an example the case of operating the neural network system 150 of this embodiment in a water purification plant.

Figure 9:
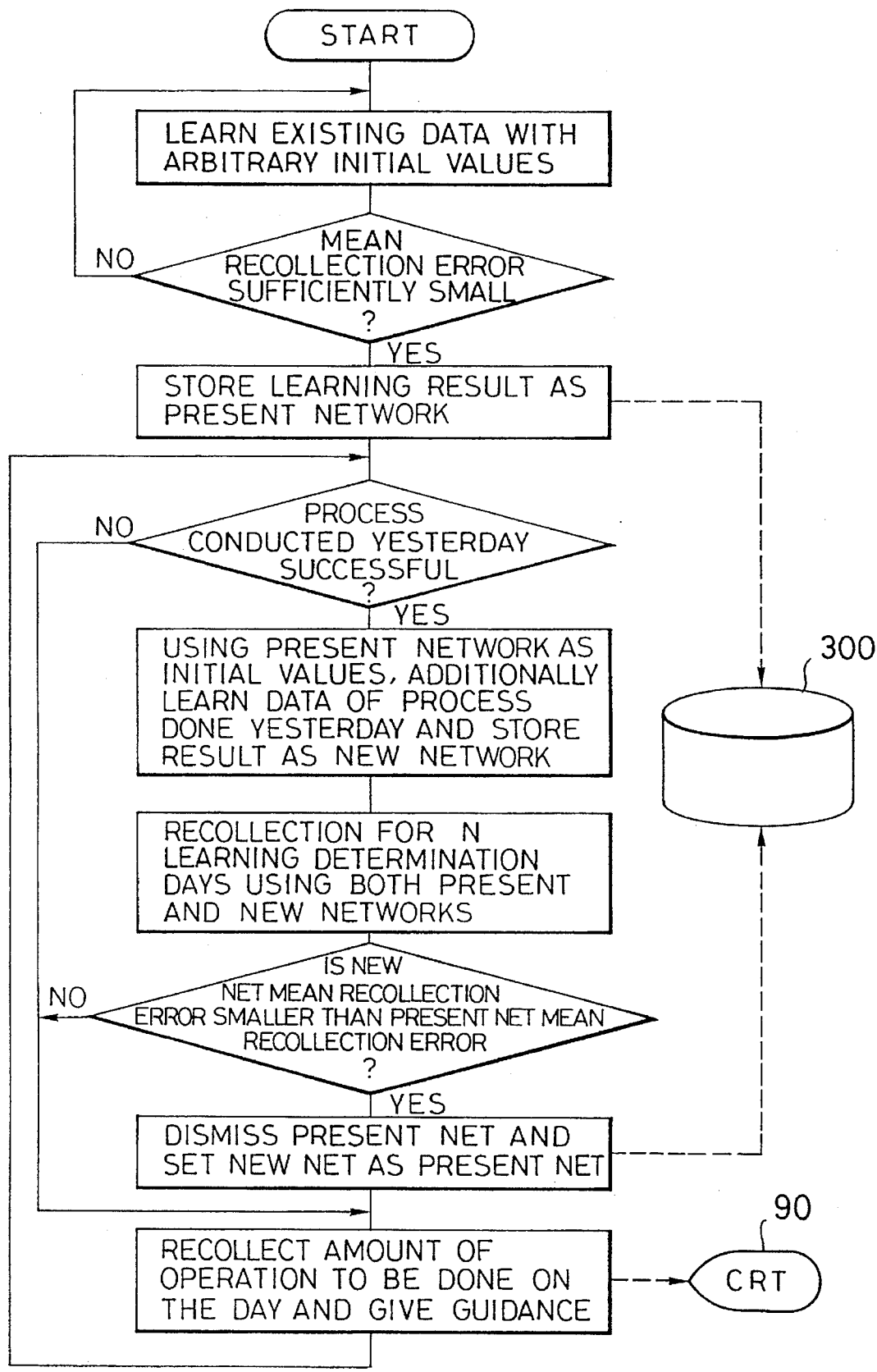
FIG. 9 is a flowchart showing a system operating sequence with automatic additional learning used in this embodiment.

In the water purification plant, because influent water quality and characteristics of the measuring instruments are changed over time, the strategy of injecting a coagulant is also changed correspondingly. If the neural network continues learning dependent on changes in the conditions from time to time, the operation support growing of its own accord can be achieved. Such learning is carried out by procedure as shown in FIG. 9. The concept of this procedure is to always provide optimum guidance in conformity with structural changes in a group of plant data by:

a. reflecting only those data, which are satisfactorily processed and are not contradictory to the past operation history, on the network;

b. reflecting new data most strongly while respecting the past operational history; and c. carrying out automatic learning free of maintenance.

Based on the procedure of automatic additional learning shown in FIG. 9, the guidance is provided while additionally learning data at a cycle of one day. Note that N learning determination days in the procedure indicates the number of days for determining a mean association error of the N days historical data as a condition of updating the network. In other words, the network is updated only when no contradiction occurs to the past N days data (i.e., when the mean association error for N days is not increased).

For the operation of injecting a coagulant in the water purification plant, it has been confirmed that the optimum N value is one when the raw influent has low turbidity under fine weather, for example, and seven or more when it has high turbidity under a rainfall, for example, (high turbidity occurs two or three times per month in average, meaning a period of approximately three months).

With this embodiment, use of the means for displaying the quantitative guidance and the association reasons in natural language enables to increase persuading power of the guidance to the operator, which has been insufficient in the conventional operation support system using a neural network.

Also, by properly suppressing causalities in the neural network during the learning of the network, it is possible to enhance the accuracy of the quantitative guidance by association and reliability of the knowledge indicated as the association reason.

Consequently, the operation can be realized with higher reliability than would be the case where operation management of the plant is performed by the operator alone, with the result being a reduced burden on the operator.

Although this embodiment is applied to a water purification plant, the same advantageous effect can also be resulted in other various plants in which judgment of the operator is considered to be important.

Next, other embodiments of the plant operation support system according to the present invention will be described with reference to FIGS. 10 to 15. Note that the parts having the same configuration as those in the embodiment of FIGS. 1 to 9 will not be explained here.

Figure 10:
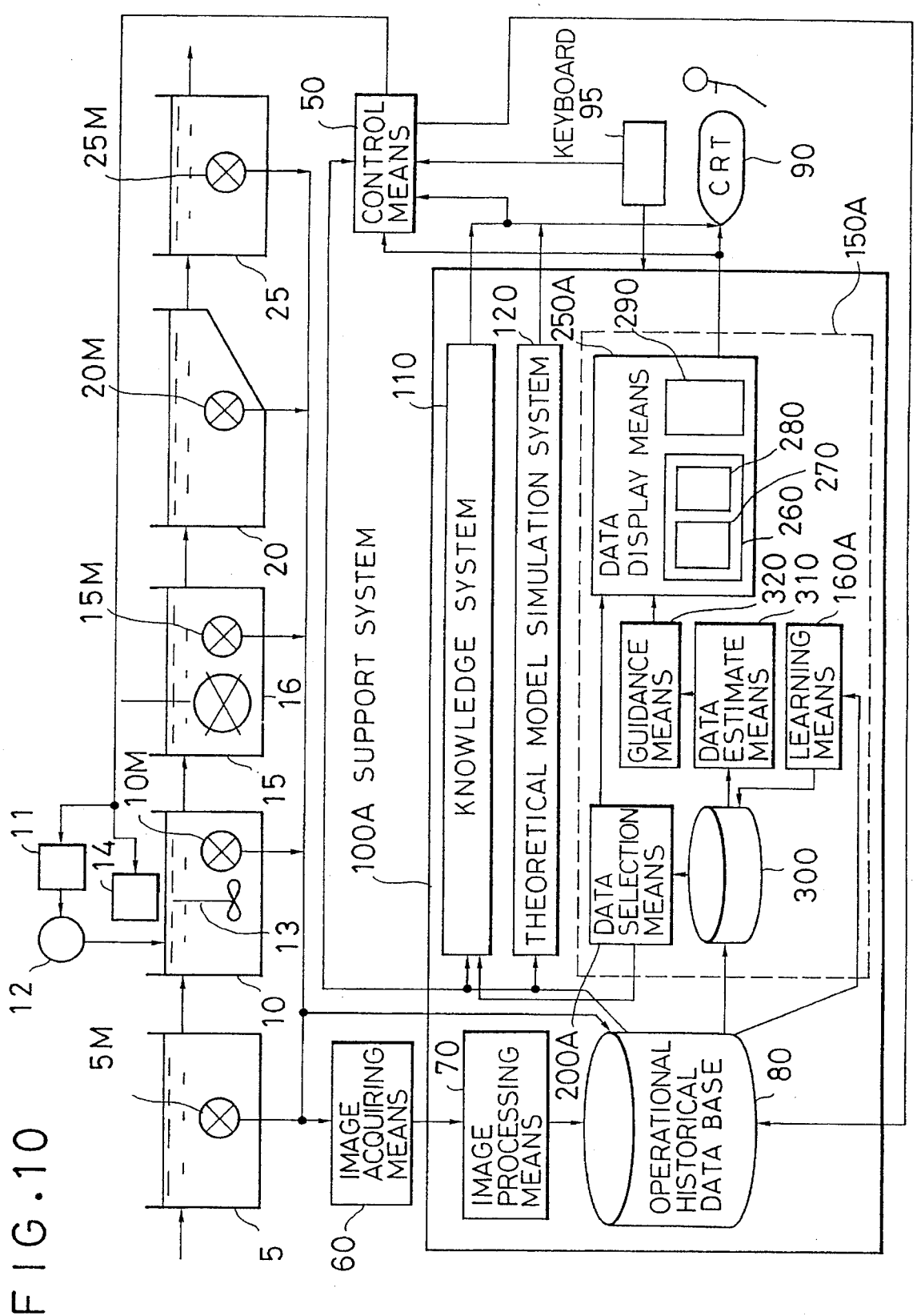
FIG. 10 is a block diagram showing the outline of another embodiment in which the plant operation support system of the present invention is applied to operation management of a water purification plant.

FIG. 10 is a block diagram showing the outline of another embodiment in which the plant operation support system of the present invention is applied to operation management of a water purification plant.

A neural network system 150A featuring this embodiment comprises a learning means 160A, a data selection means 200A, a data display means 250A, a neural network base 300, a data estimate means 310, and a guidance means 320. Among them, the data display means 250A comprises a natural language display means 260 and a control variable/ state evaluation variable display means 290. The natural language display means 260 comprises a statistically analyzing means 270 and a fuzzification means 280.

From an operational historical data base 80, those past history data which are considered to be useful are selected as training data. This selection is made by, for example, by displaying the history data on a CRT 90 and receiving select instructions of the useful history data from the operator via a keyboard 95 or the like.

The learning means 160A causes the neural network 300 to be the training data selected. During this step of the learning, the learning method of causality selection type is used to suppress unnecessary causalities and selectively leave necessary causalities. This learning method will be described later.

The neural network after the learning has two roles.

The first role is to determine quantitative guidance required for the operation management by association and send the result to the data display means 250A via the data estimate means 310. The estimated result of the data estimate means 310 is sent to the guidance means 320. The guidance means 320 sends to the data display means 250A estimate information as regards to amounts of the control variables to be taken since then (i.e., operation schedule) and/or changes in amounts of the state evaluation variables (i.e., estimation of abnormality).

The second role is to send a matrix of weighting factors after the learning to the data selection means 200A for evaluating a degree of importance of the data. The data selection means 200A considers those data which have significant causality with the control variables and/or the status evaluation variables of the plant, to be important to judgment by the operator and selects them. The selected data are sent to the data display means 250A.

The data display means 250A displays the data selected by the data selection means 200A in the form of trend graphs or histograms on the CRT 90 from time to time in the order of degree of importance. Alternatively, the selected data are evaluated qualitatively and displayed in natural language such English or as Japanese to be easily understood. The control variable/state evaluation variable display means 290 display amounts of the control variables and/or state evaluation variables of the plant obtained by association through the neural network.

The data estimate means 310 receives image input data and associates a corresponding output by using the network after the learning in the neural network base 300, thereby determining estimate values of the control variables and/or state evaluation variables. The estimated results in the means 310 are sent to the guidance means 320. Depending on the estimated results, the guidance means 320 indicates the operation schedule as to how amounts of the control variables are to be changed subsequently, and/or the information as to early prediction of abnormality based on the fluctuation estimate result of the state evaluation variables. On this occasion, a theoretical model simulator system 110 or a knowledge based system 120 is actuated to determine the result of simulation, as required.

A method of learning of the neural network model made in the neural network system 150A is the same as that stated above in connection with FIGS. 3 to 5 for the embodiment of FIG. 1 and thus will not be explained here again.

Figure 11:
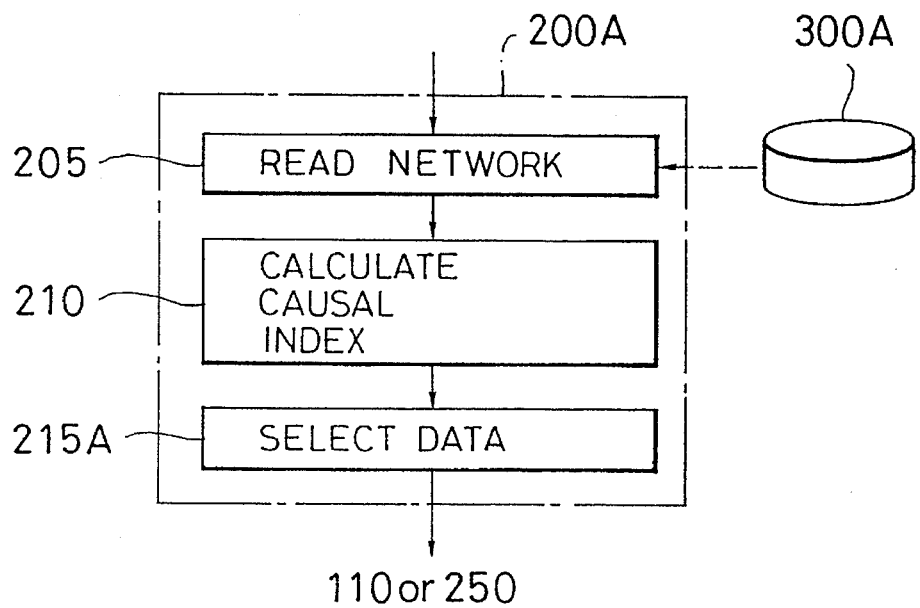
FIG. 11 is a flowchart showing an operation sequence of data selection means with a neural network used in the embodiment of FIG. 10.

The data selection means 200A will be explained below. In this means, the matrix of weighting factors of the network after the learning is analyzed and those input data at each time point which have large causality with respect to the output are selected. FIG. 11 shows steps of the data selection means 200A.

First, in a network reading step 205, the matrix of weighting factors after the learning is read from the neural network base 300.

In causal index calculating step 210, by inputting plant data $x_{1i}$ at each time point to determine $u_{3k}$ and $u_{2j}$ and calculating causal index with the same procedure as that stated above in connection with FIG. 5 for the embodiment of FIG. 1, it can be recognized which one of the data varying from time to time has large causality with respect to the output.

In a data selection step 215A, the data are selected based on the calculated causal index. Specifically, it is possible to know the intensity of the causality between $x_{1i}$ and $y_{3k}$ from the magnitude of an absolute value of $C_{3k,1i}$, and also the positive or negative correlation from plus or minus of the sign. By utilizing this, only those data which has an absolute value of the causal index exceeding a predetermined value are selected by considering them to be significant at the present time, and the selected data items are sent to the data display means 250A.

The data display means 250A displays the data corresponding to the data items sent from the data selection means 200A in the form of trend graphs or histograms in the order of degree of importance.

Further, the amounts of the control variables and/or state evaluation variables obtained by association in the neural network base 300 are displayed in the variable/state evaluation variable display means 290. Here, examples of the control variables are a coagulant injection rate, a chlorine injection rate, etc. in water purification plants and an air flow rate, a return sludge rate, etc. in sewage treatment plants. Examples of the state evaluation variables are turbidity of treated water, etc. in water purification plants and sludge volume index (SVI), etc. in sewage treatment plants.

In addition, the natural language display means 260 in the data display means 250 characterizes (qualitatively evaluate) the data corresponding to the data items selected and displays them in natural language.

Figure 12:
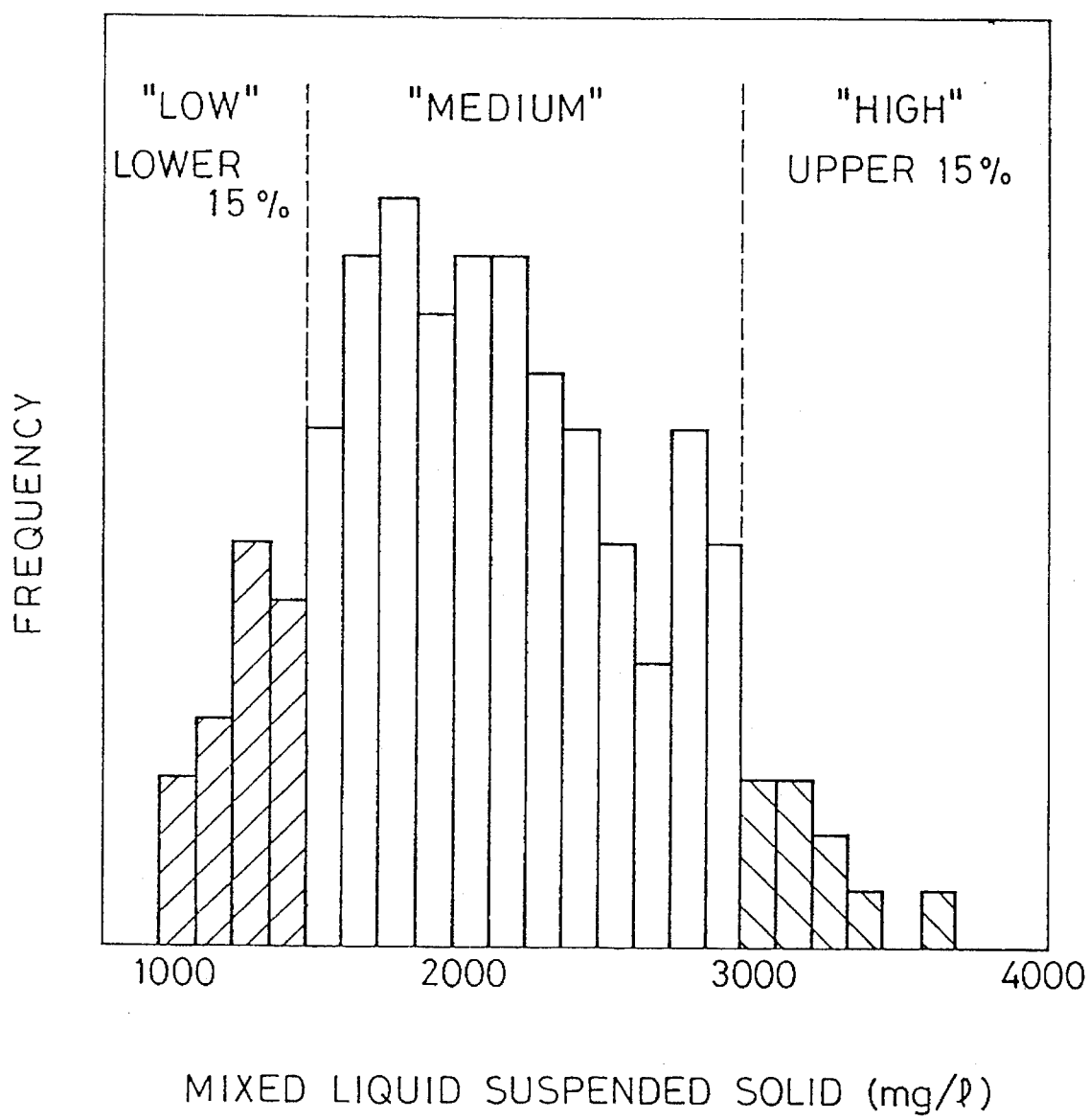
FIG. 12 is a diagram for explaining one example of operation of statistically analyzing means used in the embodiment of FIG. 10.

The statistically analyzing means 270 has information about frequency distribution for each data item and determines which data at the present time belongs to which location, as shown in FIG. 12, thereby qualitatively evaluating the present data into "higher than usual", "lower than usual", etc.

Figure 13:
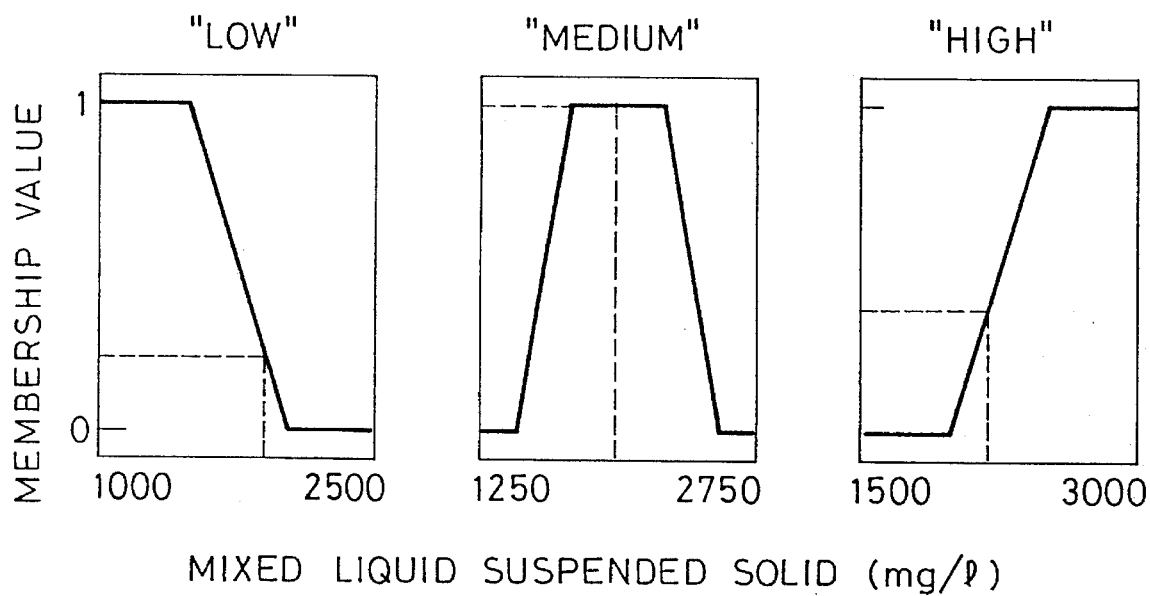
FIG. 13 is a diagram for explaining one example of operation of fuzzification means used in the embodiment of FIG. 10.

The fuzzification means 280 has membership functions fox each data item and calculates membership values of fuzzy variables (e.g., "high" and "low") as shown in FIG. 13, thereby qualitatively evaluating the data based on that fuzzy variable which has the highest value.

Figure 14:
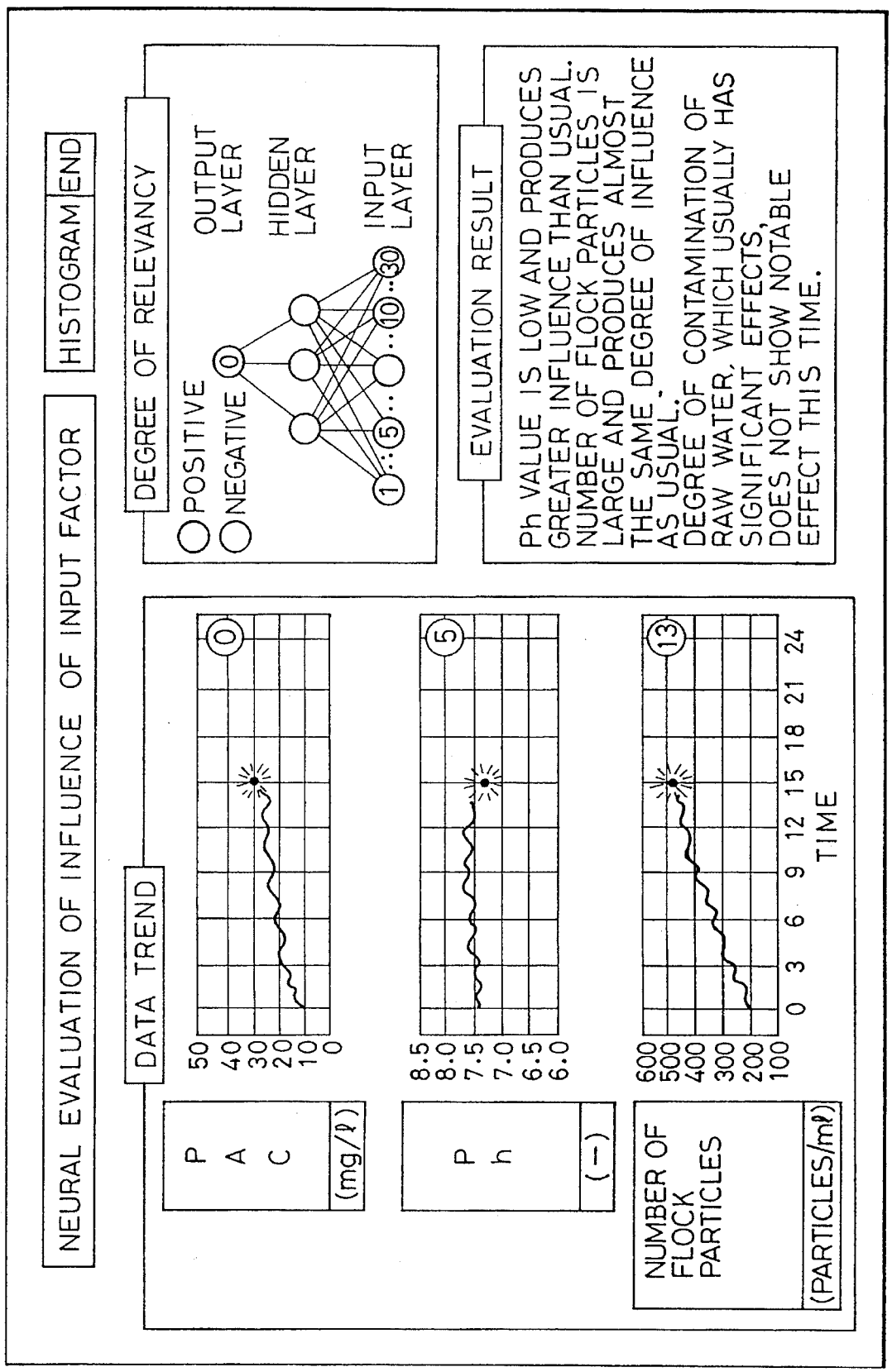
FIG. 14 is a diagram showing one example of images of data display means used in the embodiment of FIG. 10.
Figure 15:
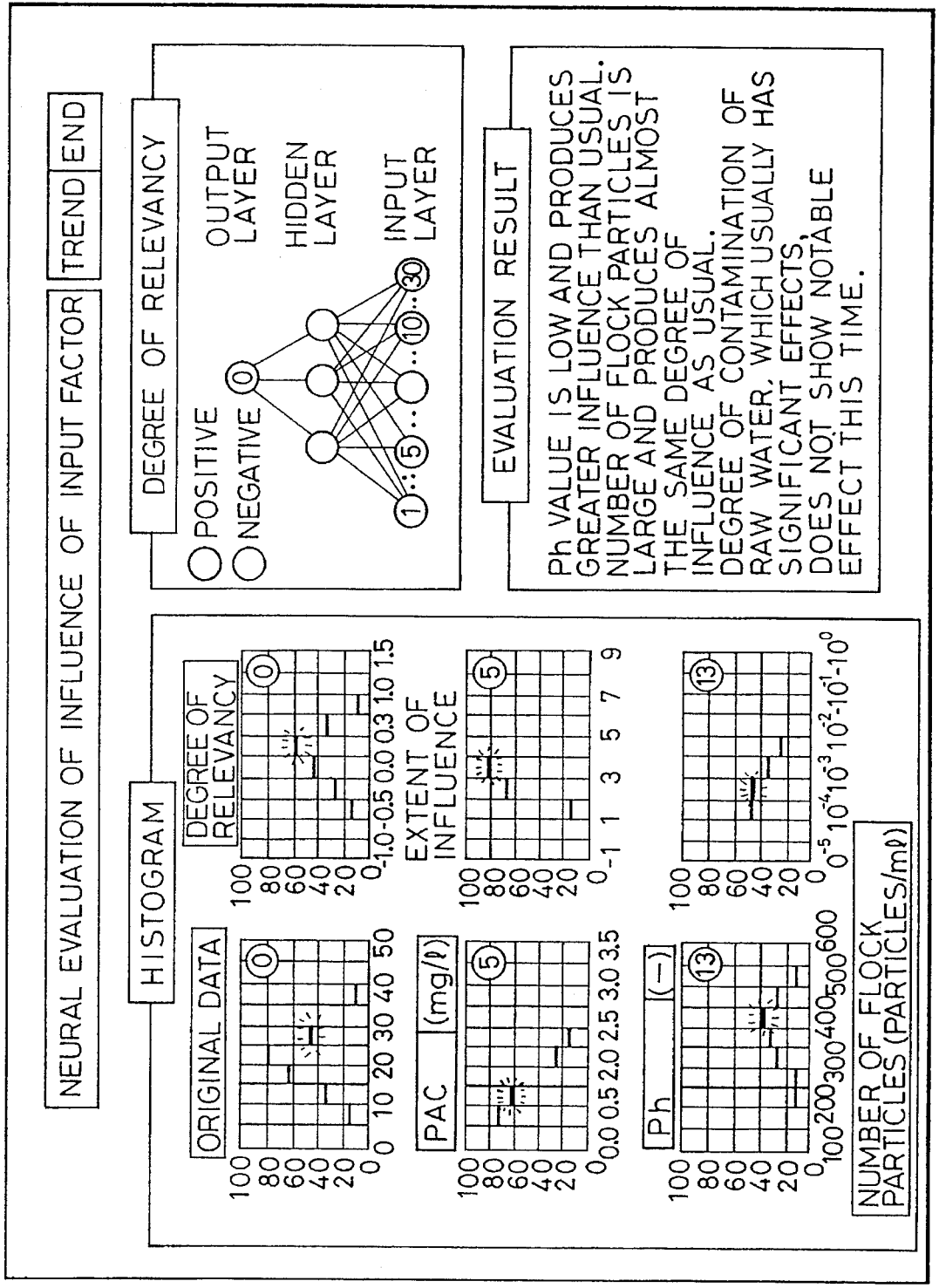
FIG. 15 is a diagram showing another example of images of the data display means used in the embodiment of FIG. 10.

Examples of the data display screen presented by the data display means 250A are shown in FIGS. 14 and 15.

In these screens, the input layer neurons are indicated in different tones or densities dependent on the causal index, allowing the operator to easily recognize the intensity of the causality with respect to the output in a visual manner. In FIG. 14, data trends of the data items selected by the data selection means 200A are displayed along with the preset data item, e.g., PAC (Poly Aluminum Chloride) injection rate, for easily understanding a fluctuation tendency until the present data. The values estimated by the data estimate means 310 are also displayed to indicate the subsequent operation schedule. In FIG. 15, histograms are displayed, allowing the operator to recognize which data at the present time belongs to which level.

A learning method used when the neural network system 150A of this embodiment is applied to a water purification plant is the same as the procedure shown in FIG. 9 for the embodiment of FIG. 1 and thus will not be explained here again.

With this embodiment, in addition to the quantitative guidance relating to the control variables and/or state evaluation variables, only those data items which have a large influence at each time point can be selected and displayed to indicate only that information of a number of plant data which is required for the operator, thereby effectively supporting judgment by the operator during the operation.

Although this embodiment is explained above as being applied to a water purification plant, the similar advantageous effect can also be obtained in a like manner to this embodiment in other various plants such as sewage treatment plants, chemical reaction plants, financial and security transactions, etc. in which judgment by the operator is considered to be important, because only data items are different to one another.

In this embodiment, the magnitude of causality between input data and output data in the plant processing determines a degree of importance. However, the object of such decision is not limited to plant data. This embodiment is also applicable to the case of examining the causality between data. Stated otherwise, this embodiment can be used as a causality determining method between input and output data.

It is easily appreciated that the support system may include the means for analyzing internal causality of the neural network and the means for displaying the quantitative guidance by association in the neural network and also the analyzed result of the internal causality as an association reason, both these means according to the embodiment of FIG. 1, as well as the data selection means for determining the magnitude of causality between input and output of the neural network and selecting that data which has causality larger than a preset reference, and the data display means for displaying the selected data, both these means according to the embodiment of FIG. 10.

According to the present invention, use of the means for displaying the quantitative guidance and the association reason in natural language enables an increase in persuading power of the guidance to the operator, which has been insufficient in the conventional operation support system using a neural network.

Also, adopting the new learning method to suppress causalities in the neural network can enhance the accuracy of the quantitative guidance by association and reliability of the knowledge indicated as the association reason.

Further, in addition to the quantitative guidance relating to the control variables and/or state evaluation variables, only those data items which have a large influence at each time point can be selected and displayed to indicate only that information of a number of plant data which is required for the operator, thereby effectively supporting judgment by the operator during the operation.

Consequently, the operation can be realized with higher reliability than would be the case where operation management of the plant is performed by the operator alone, with the result being a reduced burden on the operator.

We claim:

1. A plant operation support system in which either of a plurality of operation control variables and operation state evaluation variables of a plant are calculated through a multilayered neural network based on data indicating a plant state, and the calculated results are communicated to an operator of said plant to support plant operation, said support system comprising:

means for analyzing an internal causality between neurons in said neural network;

means for displaying quantitative guidance associated with said neural network and also an analyzed result of the internal causality between the neurons as an association reason;

data selection means for determining the magnitude of causality between input and output of said neural network and selecting data which has a causality larger than a preset reference; and data display means for displaying the selected data, wherein said data selection means selects such a data item that an absolute value of said value resulting by summing a product between the connection intensity in a path reaching an output layer neuron of interest and a differential value of a conversion function used at a passing neuron for all the paths via hidden layer neurons exceeds a predetermined value, as data having the large causality.

2. A plant operation support system according to claim 1, further comprising:

data predicting means for predicting a quantity of either said plurality of operation control variables and operation state evaluation variables of said plant; and guidance means for preparing prediction information about the operation state of said plant based on the predicted result of said data predicting means, and sending the prediction information to said data display means.

3. A plant operation support system according to claim 2, wherein said guidance means outputs at least one of an operation schedule and abnormality prediction information as said prediction information about the operation state of said plant.

4. A plant operation support system according to claim 2, wherein said data predicting means obtains said prediction information by using the same neural network as for use with said data selection means.

5. A plant operation support system in which either of a plurality of operation control variables and operation state evaluation variables of a plant are calculated through a multilayered neural network based on data indicating a plant state, and the calculated results are communicated to an operator of said plant to support plant operation, said support system comprising:

means for analyzing an internal causality between neurons in said network;

means for displaying quantitative guidance associated with said neural network and also an analyzed result of the internal causality between the neurons as an association reason;

data selection means for determining the magnitude of causality between input and output of said neural network and selecting data which has a causality larger than a preset reference; and data display means for displaying the selected data, wherein said data display means statistically analyzes each data item with respect to a population and qualitatively evaluates each of said data items.

6. A plant operation support system in which either of a plurality of operation control variables and operation state evaluation variables of a plant are calculated through a multilayered neural network based on data indicating a plant state, and the calculated results are communicated to an operator of said plant to support plant operation, said support system comprising:

means for analyzing an internal causality between neurons in said network;

means for displaying quantitative guidance associated with said neural network and also an analyzed result of the internal causality between the neurons as an association reason;

data selection means for determining the magnitude of causality between input and output of said neural network and selecting data which has a causality larger than a preset reference; and data display means for displaying the selected data, wherein said data display means determines a degree of adaptation for each data item by the use of a preset membership function and qualitatively evaluates the data item selected by said data selection means.

* * * * *